United States Patent Office 2,948,735
Patented Aug. 9, 1960

2,948,735

PROCESS FOR THE INTRODUCTION OF CARBOXYL GROUPS INTO HETEROCYCLIC COMPOUNDS

Bruno Blaser, Dusseldorf-Urdenbach, Werner Stein, Dusseldorf-Holthausen, and Hubert Schirp, Dusseldorf, Germany, assignors to Henkel & Cie. G.m.b.H., Dusseldorf-Holthausen, Germany, a corporation of Germany No Drawing. Filed Feb. 27, 1958, Ser. No. 717,811

Claims priority, application Germany Apr. 5, 1957

11 Claims. (Cl. 260—295.5)

This invention relates to the introduction of carboxyl groups into aromatic heterocyclic hydrocarbons of the pyridine series to produce aromatic heterocyclic carboxylic acids in the form of their salts. The invention more particularly relates to a direct and selective introduction of carbon dioxide into the aromatic molecule to produce polycarboxylic acids of a symmetrical nature such as isocinchomeronic acid and trimesitinic acid.

This selective carboxylation is accomplished by heating the aromatic heterocyclic hydrocarbon of the pyridine series in the presence of an acid-binding agent, and a source of carbon dioxide under anhydrous conditions. For example isocinchomeronic acid and trimesitinic acid may be produced from pyridine in such a manner.

It is an object of this invention to produce aromatic heterocyclic carboxylic acids by selective carboxylation of aromatic heterocyclic hydrocarbons of the pyridine series.

Another object of this invention is to accomplish the direct and selective carboxylation of pyridine to produce either isocinchomeronic acid or trimesitinic acid or both.

This and other objects of this invention will become apparent as the description thereof proceeds.

It is known that aromatic monocarboxylic acids may be produced by heating aromatic hydrocarbons and carbon dioxide in the presence of aluminum chloride. This process requires the use of relatively large quantities of aluminum chloride. The yields obtained thereby are meager.

In our copending application Ser. No. 686,007, filed September 25, 1957, we disclose a process for the introduction of carboxyl groups into aromatic hydrocarbons, such as benzene, by heating the same in the presence of carbon dioxide, preferably under pressure and in the presence of acid-binding agents, the heating being preferably carried out in the further presence of those materials which are capable of binding or reacting with the water formed by the reaction. In accordance with said process, for example, we have produced terephthalic acid or trimesic acid from benzene.

We have now found that it is possible to introduce carboxyl groups into the aromatic heterocyclic hydrocarbons of the pyridine series such as pyridine, quinoline or isoquinoline and into their hydrocarbon-substituted derivatives such as the picolines, lutidines, kryptidines, quinaldine, lepidine, etc. In this manner, salts of carboxylic acids of the above-mentioned heterocyclic compounds—that is, salts of pyridine-2,5-dicarboxylic acid or pyridine-2,4,6-tricarboxylic acid—may be obtained. The salts thus obtained may then be transformed into the corresponding free acids or their derivatives in accordance with well-known methods.

We have now found that carboxyl groups may be introduced into the aromatic heterocyclic compounds of the pyridine series by heating said compounds in the presence of carbon dioxide and in the presence of acid-binding agents, and also advantageously in the presence of materials which are capable of binding or reacting with the water formed during the reaction, to temperatures above 350° C. In accordance with this process, salts of aromatic heterocyclic carboxylic acids are obtained.

It is preferred to use the carbonates of alkali metals, especially potassium carbonate, as the acid-binding agent. Acid-binding agents are those chemical compounds capable of combining to neutralize the acids produced by the reaction. In place of the carbonates, however, the salts of other weak acids may be employed, such as the bicarbonates, formates or oxalates. Similarly, the corresponding compounds of other metals are suitable, such as the carbonates of the alkali earth metals.

The starting materials are preferably heated in the presence of those materials which are capable of binding or reacting with the water formed by the reaction without interfering with the reaction proper. Such materials include, for example, the carbides of various metals, such as aluminum carbide, or also the carbides of alkali earth metals or alkali metals, such as calcium carbide. Furthermore, other compounds of the above-mentioned metals, for example their nitrides, are suitable for this purpose. Free metals which are capable of reacting with water at the prevailing temperatures, such as aluminum, may also be used as the water-binding agent. The water formed by the reaction may also be tied up by other methods, for example, with the aid of alkali metal carbonates, especially potassium carbonate, which must in this case be present in substantial excess above the amount required for the neutralization of the carboxylic acids formed by the reaction.

The starting materials are heated in the presence of carbon dioxide, preferably under pressure. The quantitative ratio of carbon dioxide and aromatic heterocyclic hydrocarbons may vary within wide limits. The process may also be carried out in a different manner, for example by passing a mixture of pyridine vapor and carbon dioxide over a heated mixture of potassium carbonate and aluminum carbide, or by passing a mixture of pyridine vapor and carbon dioxide through a fluidized bed of potassium carbonate and aluminum carbide. In place of carbon dioxide, other gas mixtures may be employed which contain inert gases, such as nitrogen, methane or argon, in addition to carbon dioxide. The presence of substantial amounts of oxygen should advantageously be avoided.

The reaction generally begins to proceed at temperatures above 350° C. The optimum reaction temperature, however, may vary, depending upon the starting materials used. The upper temperature limit for the process is determined only by the decomposition temperature of the reaction products.

If the above-described starting materials are solids, they are used in this process preferably in a dry and finely divided form and intimately admixed with each other. In order to achieve as complete a reaction of the starting materials as possible, it is advantageous to maintain the reaction mixture in motion by stirring or agitating the reaction vessel. In addition, it is possible to admix the solid components with inert additives which have a large surface or to apply these solid starting materials to substances having a larger outer surface. Suitable such additives are, for example, asbestos, pumice, mineral wool, glass wool, finely divided silicic acid or finely divided aluminum oxide, kieselguhr or inert salts, such as sodium sulfate and the like.

We have further found that in order to achieve good yields the presence of catalysts is required. Suitable catalysts include especially the heavy metals, preferably cadmium, zinc, mercury, iron or lead, as well as compounds of these metals, such as their oxides or their salts formed with organic or inorganic acids. The amount of catalyst added to the reaction mixture may vary within wide limits. Sometimes the addition of large quantities of the same catalyst produces other reaction products than if smaller amounts of the catalyst are added.

As a rule, the reaction mixture may be worked up in a very simple manner. For example, in the production of pyridine-dicarboxylic acid or pyridine-tricarboxylic acid from pyridine, the solid components of the reaction mixture may be separated from excess pyridine and can thereafter be dissolved in water. After filtering off insoluble components, the carboxylic acids or their acid salts may be precipitated from the aqueous solution in accordance with known methods by acidifying the solution with inorganic or organic acids. The unreacted heterocyclic compounds can, as a rule, be recovered practically quantitatively, so that the process in general produces practically no side reaction products and gives very good yields. In the performance of the process on an industrial scale, the heterocyclic compounds serving as the starting material may be recycled. The same is true of the carbon dioxide, which can be used over again after a suitable purification, if necessary. Similarly, the other additives, such as the catalyst or the inert additives having a large surface, may be repeatedly used.

The following examples will enable persons skilled in the art to better understand and practice the invention and are not intended to limit the invention.

*Example I*

A mixture of 27.6 gm. potassium carbonate, 1.0 gm. cadmium fluoride and 10.0 gm. finely milled aluminum carbide (grain size less than 0.06 mm.) was heated together with 300 cc. pyridine in an autoclave having a net volume of 600 cc. for 15 hours at 400° C. The pyridine had previously been dried over caustic alkali and then distilled. Prior to heating the autoclave, carbon dioxide was introduced therein under pressure until the internal pressure reached 50 atmospheres (at 40° C.). Upon heating to the indicated temperature, the internal pressure rose to 550 atmospheres and this pressure was further increased to 950 atmospheres by introducing additional carbon dioxide with the aid of a compressor. After cooling and releasing the pressure from the autoclave, the solid reaction product was separated from the excess pyridine by filtration and the filter cake was dissolved in about 800 cc. hot water. Subsequently, the aqueous solution was filtered to separate insoluble components, such as the catalyst and aluminum oxide or hydroxide, and the filtrate was acidified to a pH of 3 with hydrochloric acid. Upon cooling the acidified solution, 5.1 gm. of the monopotassium salt of trimesitinic acid (pyridine-2,4,6-tricarboxylic acid) crystallized out; by concentrating the acidified solution to a volume of 400 cc. and thereafter cooling the same to 0° C., an additional 3.7 gm. of the monopotassium salt of trimesitinic acid were obtained. The total of 8.8 gm. represents a yield of 26.5% of theoretical based on the limiting potassium carbonate.

*Example II*

A mixture of 27.6 gm. potassium carbonate and 10.0 gm. finely milled aluminum carbide (grain size less than 0.06 mm.) was heated together with 300 cc. dried and distilled pyridine, in which about 2.5 gm. cadmium iodide were dissolved, in an autoclave having a net volume of 600 cc. for 15 hours at 400° C. Prior to heating, carbon dioxide was introduced under pressure until the internal pressure reached 50 atmospheres. While raising the temperature of the autoclave to 400° C., additional carbon dioxide was introduced with the aid of a compressor, so that at 400° C. a pressure of 1500 atmospheres resulted. The reaction product was worked up in the manner described in the previous example. 7.25 gm. of the monopotassium salt of trimesitinic acid were obtained.

*Example III*

A mixture of 27.6 gm. potassium carbonate, 5.0 gm. cadmium fluoride and 10.0 gm. finely milled aluminum carbide (grain size less than 0.06 mm.) was heated together with 325 cc. dried and distilled pyridine in an autoclave having a net volume of 600 cc. for 17 hours at 400° C. A sufficient amount of carbon dioxide was introduced into the autoclave to produce a pressure of 1280 atmospheres at 400° C. The reaction product was worked up in the manner described above. 9.6 gm. of the monopotassium salt of isocinchomeronic acid (pyridine-2,5-dicarboxylic acid) were obtained.

*Example IV*

A mixture of 27.6 gm. potassium carbonate, 1.0 gm. cadmium fluoride and 10.0 gm. aluminum carbide (grain size below 0.06 mm.) was heated together with 200 cc. anhydrous pyridine in an autoclave having a net volume of 600 cc. for 28 hours at 410° C. At the beginning of the run a sufficient amount of carbon dioxide was introduced into the autoclave under pressure to develop a pressure of 200 atmospheres at the reaction temperature. After cooling and releasing the pressure from the autoclave, the reaction product, which weighed 47.5 gm. was separated from excess pyridine by filtration and the filter cake was dissolved in 300 cc. hot water. The aqueous solution was then again filtered and the clear filtrate was acidified to a pH of 2 with hydrochloric acid and then cooled to 0° C. 9.3 gm. of the monopotassium salt of trimesitinic acid (pyridine-2,4,6-tricarboxylic acid) crystallized out. After further acidifying the mother liquor, it was extracted with ether and yielded an additional 0.85 gm. of a mixutre of pyridine-dicarboxylic and pyridine-tricarboxylic acids.

In like manner quinoline and isoquinoline can be treated with carbon dioxide to produce quinoline and isoquinoline di- and polycarboxylic acids.

The above examples disclose various features of the invention. Example III shows the effect of increasing the concentration of catalysts on the product produced compared with Example I. Example II shows use of a different catalyst and Example IV shows the effect of lower pressures and longer heating as compared with Example I.

While we have described particular embodiments of our invention, it will be understood that the invention is not limited thereto and that various modifications and adaptations thereof may be made without departing from the scope of the invention as set forth in the above disclosure and the following claims.

We claim:

1. A process for the introduction of carboxyl groups into pyridine which comprises heating pyridine under anhydrous conditions to a temperature above about 350° C. in the presence of carbon dioxide and an acid-binding agent selected from the group consisting of the carbonates of alkaline earth and alkali metals and recovering pyridine polycarboxylic acids in the form of their salts.

2. A process for the introduction of carboxyl groups into pyridine which comprises heating pyridine to a temperature above about 350° C. in the presence of carbon dioxide, an acid-binding agent selected from the group consisting of the carbonates of alkaline earth and alkali metals and a compound capable of binding the water produced by the reaction selected from the group consisting of carbides and nitrides of aluminum, carbides and nitrides of alkaline earth metals, carbides and nitrides of alkali metals and alkali metal carbonates in excess of that required for the neutralization of the carboxyl groups formed during the reaction and recovering pyridine polycarboxylic acids in the form of their salts.

3. A process for the introduction of carboxyl groups into pyridine which comprises heating pyridine to a temperature above about 350° C. in the presence of carbon dioxide, an alkali metal carbonate and a compound capable of binding the water produced by the reaction selected from the group consisting of carbides and nitrides of aluminum, carbides and nitrides of alkaline earth metals, carbides and nitrides of alkali metals and alkali metal carbonates in excess of that required for the neutralization of the carboxyl groups formed during the reaction and recovering a mixture of pyridine dicarboxylic acids and pyridine tricarboxylic acids in the form of their salts.

4. The process of claim 3 wherein the reaction is carried out under superatmospheric pressure in the presence of a heavy metal catalyst selected from the group consisting of cadmium, zinc, mercury, iron, lead and compounds thereof.

5. The process of claim 3 wherein the reaction is carried out in the presence of a solid inert diluent.

6. The process of claim 4 wherein said alkali metal carbonate is potassium carbonate and said compound capable of binding the water produced is aluminum carbide.

7. A process for the production of acids selected from the group consisting of isocinchomeronic acid and trimesitinic acid which comprises the steps of preparing the alkali metal salts of said acids by heating pyridine to a temperature above about 350° C. under superatmospheric pressure in the presence of carbon dioxide, an alkali metal carbonate, a compound capable of binding the water produced by the reaction selected from the group consisting of carbides and nitrides of aluminum, carbides and nitrides of alkaline earth metals, carbides and nitrides of alkali metals and alkali metal carbonates in excess of that required for the neutralization of the carboxyl groups formed during the reaction, and a heavy metal catalyst selected from the group consisting of cadmium, zinc, mercury, iron, lead and compounds thereof and recovering said acids in the form of a salt with said alkali metal.

8. The process of claim 7 wherein the amount of isocinchomeronic acid recovered is increased by increasing the amount of said heavy metal catalyst in the reaction mixture.

9. The process of claim 7 wherein the amount of trimesitinic acid recovered is increased by decreasing the amount of said heavy metal catalyst in the reaction mixture.

10. The process of claim 7 wherein said alkali metal carbonate is potassium carbonate.

11. A process for the production of acids selected from the group consisting of isocinchomeronic acid and trimesitinic acid which comprises the steps of preparing the potassium salts of said acids by heating pyridine to a temperature above about 350° C. under superatmospheric pressure in the presence of excess carbon dioxide, potassium carbonate, aluminum carbide, and a cadmium-containing catalyst, and recovering said acids in the form of their potassium salts.

References Cited in the file of this patent

UNITED STATES PATENTS

| | | |
|---|---|---|
| 2,729,673 | Prichard | Jan. 3, 1956 |
| 2,794,830 | Raecke et al. | June 4, 1957 |
| 2,816,918 | Wynkoop et al. | Dec. 17, 1957 |
| 2,823,229 | Raecke | Feb. 11, 1958 |
| 2,823,230 | Raecke | Feb. 11, 1958 |
| 2,900,368 | Raecke et al. | Aug. 18, 1959 |